US007284215B1

(12) United States Patent
Kim et al.

(10) Patent No.: US 7,284,215 B1
(45) Date of Patent: Oct. 16, 2007

(54) METHOD TO SOLVE SIMILAR TIMING PATHS

(75) Inventors: Von-Kyoung Kim, Santa Clara, CA (US); Dakshesh Amin, Sunnyvale, CA (US); Sriram Satakopan, Bangalore (IN); Peter F. Lai, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 333 days.

(21) Appl. No.: 10/798,046

(22) Filed: Mar. 11, 2004

(51) Int. Cl.
*G06F 17/50* (2006.01)
(52) U.S. Cl. ............................................... 716/6; 716/5
(58) Field of Classification Search ................. 716/5–6
See application file for complete search history.

(56) References Cited

U.S. PATENT DOCUMENTS

| | | | |
|---|---|---|---|
| 6,425,114 B1 * | 7/2002 | Chan et al. ..................... 716/6 |
| 6,701,289 B1 * | 3/2004 | Garnett et al. ................. 703/14 |
| 6,766,504 B1 * | 7/2004 | Rahut et al. ................... 716/13 |
| 7,069,528 B2 * | 6/2006 | Kovacs et al. .................. 716/6 |
| 2005/0050496 A1 * | 3/2005 | Kovacs et al. .................. 716/6 |

* cited by examiner

*Primary Examiner*—Vuthe Siek
(74) *Attorney, Agent, or Firm*—Dorsey & Whitney LLP

(57) ABSTRACT

A technique for improving multiple critical timing paths that exhibit similar characteristics has been discovered. The technique efficiently improves multiple critical timing paths by reducing the number of unique critical timing path patterns for analysis. In some embodiments of the present invention a method for use in connection with an integrated circuit design includes identifying distinct timing paths of the integrated circuit design. The distinct timing paths have timing violations. The method includes associating a first plurality of the distinct timing paths with a first set of timing paths. Individual ones of the first plurality belonging to a second set of timing paths and include a first common characteristic. The method includes improving the first set of timing paths based at least in part on an improvement to an individual timing path of the first set of timing paths.

19 Claims, 6 Drawing Sheets

302 → (1) Bucket by source block name:

BUCKET: emcu_ecu_ecaddr_ctl
PRIORITY: 43
SOURCE: emcu_ecu_ecaddr_ctl   ←bucket by source block
DESTINATION:
NET:
DEVICE:

304 → (2) Bucket by destination block name:

BUCKET: emcu_ecu_ecaddr_dp
PRIORITY: 45
SOURCE:
DESTINATION: emcu_ecu_ecaddr_dp   ←bucket by destination block
NET:
DEVICE:

306 → (3) Bucket by source block name:

BUCKET: ramtest
PRIORITY: 100
SOURCE:
DESTINATION:
NET: ramtest   ← bucket by common net name (useful for bus)
DEVICE:

308 → (4) Bucket by device name:

BUCKET: emu_ecu_ecaddr_dp
PRIORITY: 45
SOURCE:
DESTINATION:
NET:
DEVICE: paths_share_common_device   ← bucket by common device 310 → (5) Bucket by combination of fields:

BUCKET: ramtest
PRIORITY: 100
SOURCE: ramtest
DESTINATION: ramtest
NET: ramtest
DEVICE: ramtest

FIG. 3

MAX T = 0.974ns :    30 paths :    3 signatures :  BUCKET 1_AAA
MAX T = 0.957ns :     6 paths :    1 signatures :  BUCKET 2_BBB
================================================
<1__emu>

1 : BUCKET: AAA
PRIORITY: 45
SOURCE:
DESTINATION:
NET: aaa
DEVICE:

Number of paths = 30

Number of signatures = 2 signature # 1 : ecram.mux4i.inv.eccgen.fsdsql
bucket : 1_AAA
        p1(0.974ns) p2 (0.971ns) p6(0.967ns) p7(0.967ns)

Possibility 1:
Setup constraint violation 0.024ns dev_6 (fsdsql_24x d v -> 12 clk ^)
        Clk edge: clk ^ -> dev_6/12clk ^ at 0.000ns +Tcycle = 0.950ns
        Clock jitter: 0.100ns
        Setup time: -0.120ns
        Data dege: clk ^ -> dev_6/d[1] v at 0.994ns
        Required cycle time: 0.974ns (1.00 cycle path)

| Delay | Gate | Wire | Load Cap | Node | Device | Cell | Pin to Pin |
|---|---|---|---|---|---|---|---|
| 0.000ns | 0.000ns | 0.000ns | 560.236pF | clk ^ | | | |
| * 0.000ns | 0.582ns | 0.000ns | 0.027pF | clk ^ | dev_1 | ecram | clk ^ → do ^ |
| 0.582ns | 0.000ns | 0.001ns | 0.027pF | aaa ^ | | | |
| 0.584ns | 0.048ns | 0.000ns | 0.021pF | aaa ^ | dev_2 | rptr_48x | in ^ → out ^ |
| 0.632ns | 0.000ns | 0.040ns | 0.021pF | bbb ^ | | | |
| * 0.672ns | 0.061ns | 0.000ns | 0.036pF | bbb ^ | dev_3 | mux4i_8x | d2 ^ → out v |
| 0.732ns | 0.000ns | 0.001ns | 0.036pF | ccc v | | | |
| 0.733ns | 0.036ns | 0.000ns | 0.151pF | ccc v | dev_4 | inv_24x | in v → out ^ |
| 0.770ns | 0.000ns | 0.022ns | 0.151pF | ddd ^ | | | |
| 0.792ns | 0.202ns | 0.000ns | 0.003pF | ddd ^ | dev_5 | eccgen | chk ^ → ec v |
| 0.993ns | 0.000ns | 0.000ns | 0.003pF | eee v | | | |
| 0.994ns | | | | eee v | | | |

FIG. 5A signature # 2 : ecram.mux4i.inv.eccgen
bucket : 1_AAA
        p3(0.969ps) p4(0.967ns) p5(0.967ns) p8(0.966ns) p9(0.965ns) p10(0.965ns)
        p11(0.959ns) p12(0.958ns) p13(0.958ns) p16(0.957ns) p17(0.956ns) p20(0.956ns)
        p21(0.956ns) p22(0.956ns) p23(0.955ns) p26(0.954ns) p27(0.954ns) p28(0.953ns)
        p29(0.952ns) p30(0.952ns) p31(0.952ns) p32(0.952ns) p33(0.952ns) p34(0.952ns)
        p35(0.950ns) p36(0.950ns)

Possibility 3:
Setup constraint violation 0.019ns dev_5 (eccgen check[3] ^ -> clk ^)
    Clk edge: clk ^ -> dev_5/clk ^ at 0.000ns + Tcycle = 0.950ns
    Clock jitter: 0.100ns
    Setup time: 0.078ns
    Data edge: clk ^ -> dev_5/check[3] ^ at 0.792ns
    Required cycle time: 0.969ns (1.00 cycle path)

|   | Delay | Gate | Wire | Load Cap | Node | Device | Cell | Pin to Pin |
|---|---|---|---|---|---|---|---|---|
|   | 0.000ns | 0.000ns | 0.000ns | 560.236pF | clk ^ |  |  |  |
| * | 0.000ns | 0.582ns | 0.000ns | 0.027pF | clk ^ | dev_1 | ecram | clk ^ → do ^ |
|   | 0.582ns | 0.000ns | 0.001ns | 0.027pF | aaa ^ |  |  |  |
|   | 0.584ns | 0.048ns | 0.000ns | 0.021pF | aaa ^ | dev_2 | rptr_48x | in ^ → out ^ |
|   | 0.632ns | 0.000ns | 0.040ns | 0.021pF | bbb ^ |  |  |  |
| * | 0.672ns | 0.061ns | 0.000ns | 0.036pF | bbb ^ | dev_3 | mux4i_8x | d2 ^ → out v |
|   | 0.732ns | 0.000ns | 0.001ns | 0.036pF | ccc v |  |  |  |
|   | 0.733ns | 0.036ns | 0.000ns | 0.151pF | ccc v | dev_4 | inv_24x | in v → out |
|   | 0.770ns | 0.000ns | 0.022ns | 0.151pF | ddd ^ |  |  |  |
|   | 0.792ns |  |  |  | ddd ^ |  |  |  |

FIG. 5B

| MAX T = | 0.847ns : | 29 paths : | 5 signatures : | BUCKET 1_AAA |
|---|---|---|---|---|
| MAX T = | 0.842ns : | 2 paths : | 1 signatures : | BUCKET 2_BBB |
| MAX T = | 0.841ns : | 138 paths : | 3 signatures : | BUCKET 3_CCC |
| MAX T = | 0.840ns : | 134 paths : | 5 signatures : | BUCKET 4_DDD |
| MAX T = | 0.839ns : | 18 paths : | 7 signatures : | BUCKET 5_EEE |
| MAX T = | 0.830ns : | 3 paths : | 2 signatures : | BUCKET 6_FFF |
| MAX T = | 0.824ns : | 2 paths : | 1 signatures : | BUCKET 7_GGG |

FIG. 6

METHOD TO SOLVE SIMILAR TIMING PATHS

BACKGROUND

1. Field of the Invention

The present invention relates generally to techniques for designing semiconductor devices and, in particular, to techniques for reducing timing violations in a semiconductor design.

2. Description of the Related Art

Increasing an operating frequency of an integrated circuit generally includes reducing delays through critical timing paths (i.e., paths that determine an operating frequency of an integrated circuit, typically the longest paths in the circuit). However, integrated circuits may include a number of transistors and interconnections that makes it burdensome to perform timing enhancements of a large number of critical timing paths. Accordingly, there is a need for a technique that reduces the number of critical timing paths for analysis to improve circuit performance.

SUMMARY

A technique for improving multiple critical timing paths that exhibit similar characteristics has been discovered. The technique efficiently improves multiple critical timing paths by reducing the number of unique critical timing path patterns for analysis. In some embodiments of the present invention a method for use in connection with an integrated circuit design includes identifying distinct timing paths of the integrated circuit design. The distinct timing paths have timing violations. The method includes associating a first plurality of the distinct timing paths with a first set of timing paths. Individual ones of the first plurality belonging to a second set of timing paths and include a first common characteristic. The method includes improving the first set of timing paths based at least in part on an improvement to an individual timing path of the first set of timing paths.

In some embodiments of the present invention, a semiconductor integrated circuit includes a plurality of circuits having distinct timing paths. The distinct timing paths have a first common characteristic. The individual ones of the plurality of circuits include at least one circuit element not present in timing paths unaltered for reducing timing violations. The circuit element is inserted into the plurality of circuits based at least in part on an improvement to a first timing path of the distinct timing paths.

In some embodiments of the present invention, a computer readable encoding of a semiconductor integrated circuit design includes one or more design file media encoding representations of a plurality of circuits having distinct timing paths. The distinct timing paths have a first common characteristic. Individual ones of the plurality of circuits include at least one circuit element not present in timing paths unaltered for reducing timing violations. The circuit element is inserted into the plurality of circuits based at least in part on an improvement to a first timing path of the distinct timing paths.

In some embodiments of the present invention, a method of making a semiconductor integrated circuit includes preparing the one or more design files for the semiconductor integrated circuit including a plurality of circuits having distinct timing paths. The distinct timing paths have a first common characteristic. The method includes substituting into the plurality of circuit paths equivalent circuit elements not present in timing paths unaltered for reducing timing violations. The equivalent circuits are inserted into the same integrated circuit based at least in part on an improvement to a first timing path of the distinct timing paths. The method includes encoding the plurality of circuit paths in design file outputs as at least part of a computer readable media product encoding a design file representation of the semiconductor integrated circuit.

In some embodiments of the present invention, a computer program product executable encoded in one or more computer readable media is selected from the set of disk, tape, or other magnetic, optical, or electronic storage medium. The computer program product executable includes instructions for associating a first plurality of the distinct timing paths with a first set of timing paths. Individual ones of the first plurality belong to a second set of timing paths and include a first common characteristic.

As a result, integrated circuit designs prepared in accordance with the present invention may exhibit substantial design cycle time improvements.

BRIEF DESCRIPTION OF THE DRAWINGS

The present invention may be better understood, and its numerous objects, features, and advantages made apparent to those skilled in the art by referencing the accompanying drawings.

FIG. 3 illustrates exemplary control information in accordance with some embodiments of the present invention.

FIG. 5A illustrates exemplary information in accordance with some embodiments of the present invention.

FIG. 5B illustrates exemplary information in accordance with some embodiments of the present invention.

FIG. 6 illustrates exemplary information in accordance with some embodiments of the present invention.

The use of the same reference symbols in different drawings indicates similar or identical items.

DESCRIPTION OF THE PREFERRED EMBODIMENT(S)

The developed techniques are applicable, generally, at a variety of levels of design hierarchy, such as at the discrete electrical element level, e.g., transistor level, at the logic gate or standard cell level, or at larger circuit block levels. Associations and optimizations may be made at any level of design hierarchy appropriate to a particular integrated circuit design and/or design environment. For purposes of clarity, much of the description that follows is expressed in the context of devices, e.g., instances of standard cells or custom-designed cells that implement logic functions. In view of the foregoing, and without limitation, aspects of an exemplary exploitation of the developed techniques are now described in the context of networks of standard cell logic devices, timing analysis thereof, and optimizations of timing paths including the standard cells. Based on the description herein, persons of ordinary skill in the art will appreciate suitable exploitations for gate devices at a variety of levels of design hierarchy.

Figure 1:
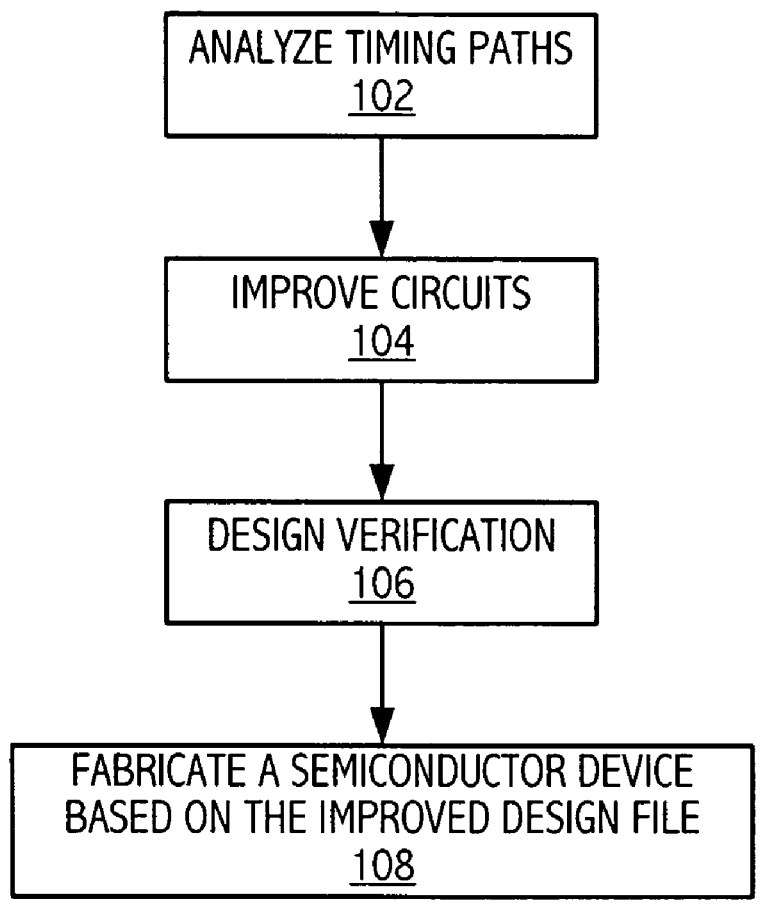
FIG. 1 depicts information and control flows for a technique for processing a design for a semiconductor device in accordance with some embodiments of the present invention.

Referring to FIG. 1, a technique for processing a design for a semiconductor device is illustrated. The technique includes analyzing timing paths in a design file (102). Timing paths which fail to meet design targets may be improved and updated in a modified design file according to any suitable technique (104). After modifying the design file, design verification tests, such as noise tests, timing tests, and physical verification tests, may be re-executed (106) to verify the new design that includes the improved circuits. The design file may then be used to fabricate a semiconductor chip (108) according to any suitable procedure for manufacturing a semiconductor chip.

Figure 2:
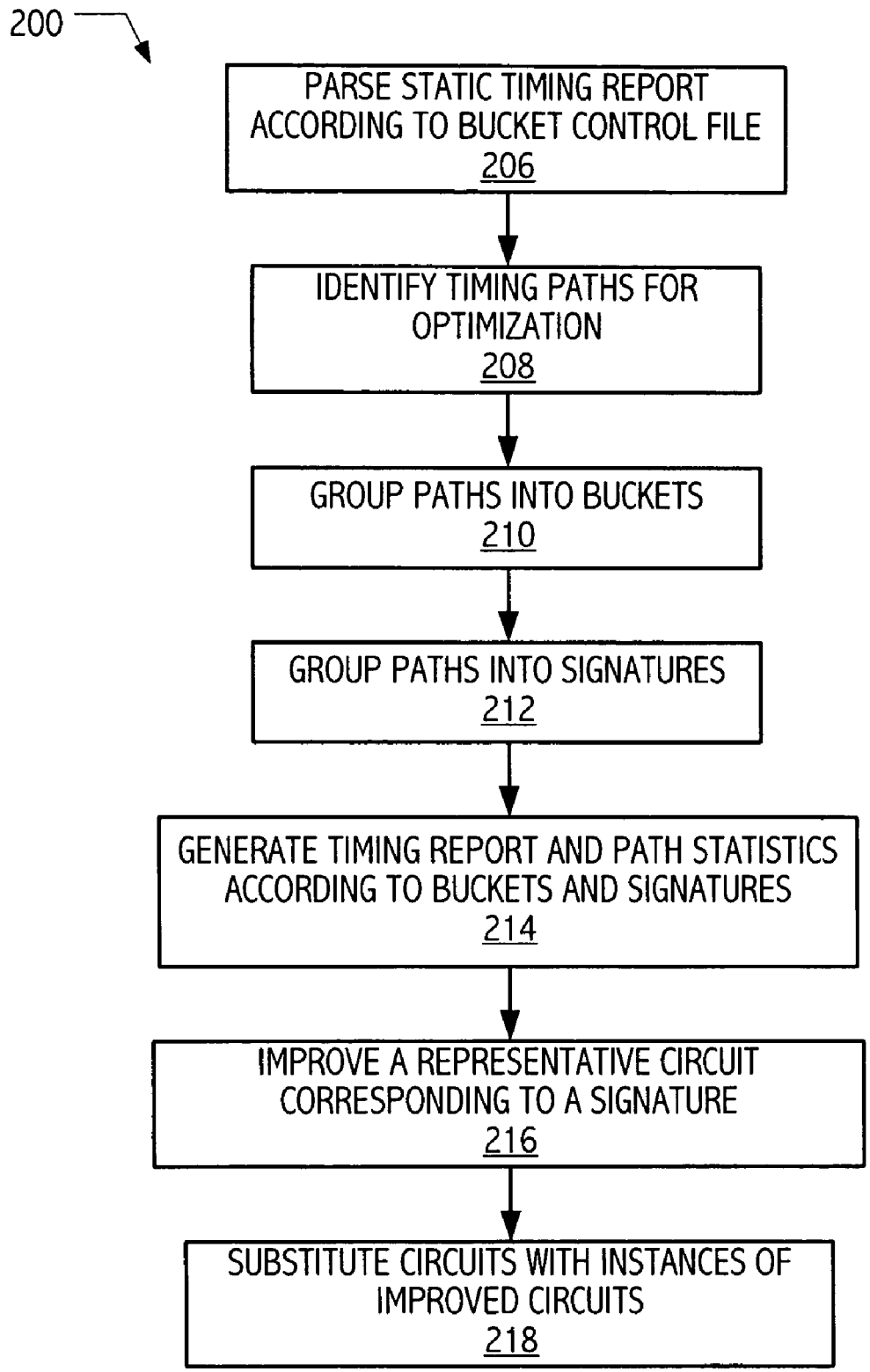
FIG. 2 depicts information and control flows for a technique for processing a design for a semiconductor device in accordance with some embodiments of the present invention.

FIG. 2 illustrates a technique for processing timing paths in an integrated circuit design file that parses a static timing analysis report according to a bucket control file (206). The static timing analysis report includes timing information for paths in the integrated circuit design. The static timing analysis report may be generated by any suitable tool, e.g., PEARL Static Timing Analyzer, available from Cadence Design Systems, Inc. The technique may be modified to interface with various formats of a static timing analysis report generated by a suitable tool.

The technique identifies timing paths for analysis (208). In one realization, the technique identifies timing paths that have a cycle time greater than a maximum cycle-time indicated by a bucket control file or user input. This timing information may be used to limit the number of paths analyzed to those paths that fail to meet the timing constraint. The timing constraint may be a maximum path cycle-time, a minimum path cycle-time, or other appropriate timing constraint.

The technique associates similar timing paths with a category, e.g., "bucket" (210) identified in the bucket control file. An exemplary bucket control file, illustrated in FIG. 3, includes grouping information and bucket priority information. A timing path may be associated with a bucket based on any suitable criteria, including, but not limited to a source block (302), a destination block (304), inclusion of a particular net (306), inclusion of a particular device (308), or a combination of criteria (310). A source bucket may be useful for high fan-out blocks, i.e., blocks from which many timing paths diverge. A destination bucket may be useful for high fan-in blocks, i.e., blocks to which many paths converge. Net and device buckets group together timing paths with common net names and common device names. These buckets may be useful for defining a bucket for a particular bus, e.g., input/output timing paths. A bucket may be defined according to multiple categories.

In some realizations of the invention, a particular timing path may meet the criteria for multiple buckets. The timing path will be associated with a particular bucket based on priorities assigned to the multiple buckets in the bucket control file. Priorities may be assigned according to any appropriate criteria. For example, bucket assignments susceptible to having many signatures may be assigned a lower priority than bucket assignments susceptible to having fewer signatures. Priority assignments preferably balance the number of passes through the categorization procedure to the number of signatures for timing path improvements. A high priority assignment of a bucket associated with a particular block will focus timing analysis on that particular design block by associating more paths with that bucket. The priority parameters included in FIG. 3 indicate higher priority for those buckets with a higher priority number (e.g., ramtest has higher priority than emu_ecu_ecaddr_ctl), but priorities may be indicated by any other suitable technique.

Figure 4A:
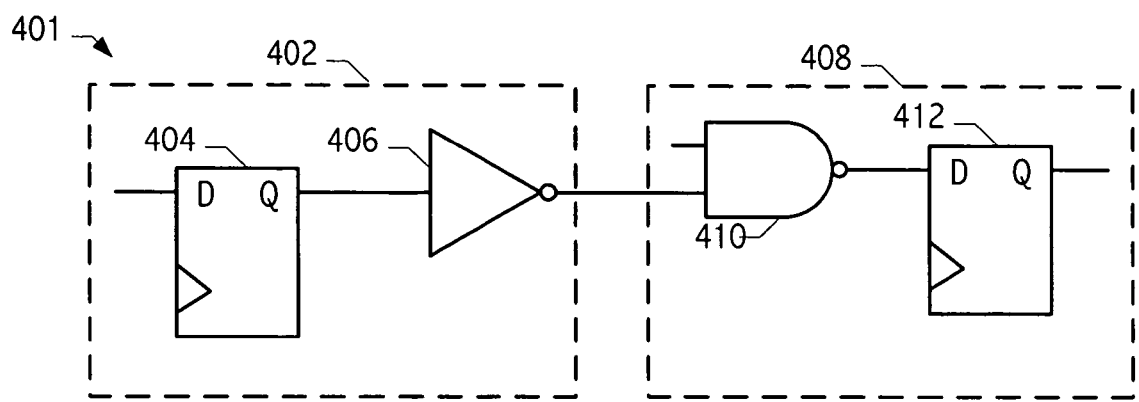
FIG. 4A illustrates an exemplary timing path in accordance with some embodiments of the present invention.
Figure 4B:
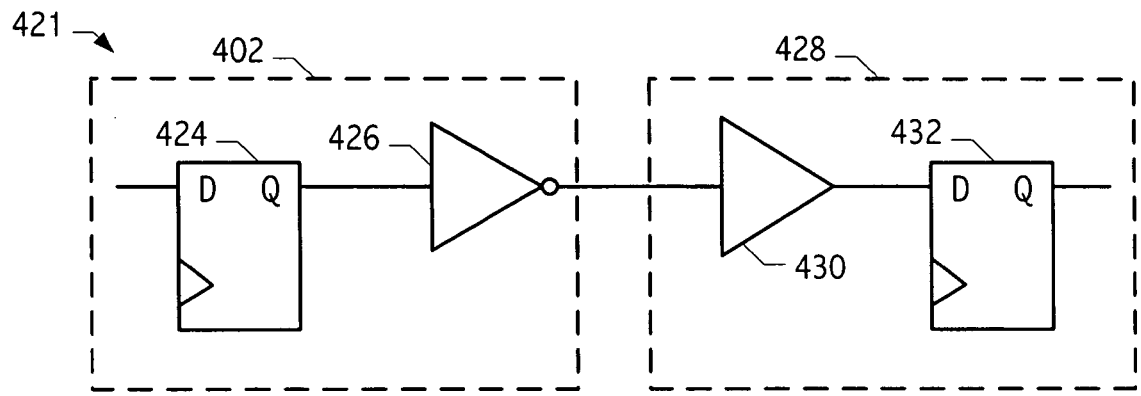
FIG. 4B illustrates an exemplary timing path in accordance with some embodiments of the present invention.
Figure 4C:
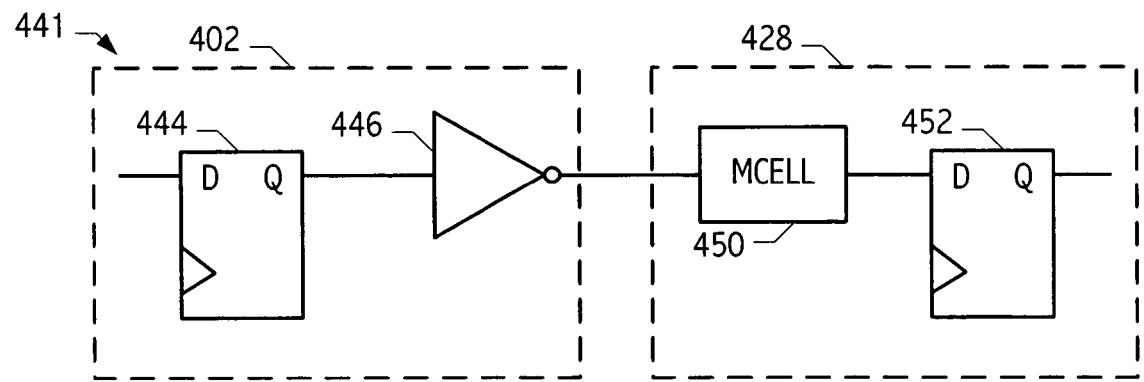
FIG. 4C illustrates an exemplary timing path in accordance with some embodiments of the present invention.

An exemplary embodiment of the present invention groups timing paths of a synchronous design into buckets based on a block of origin and a destination block. Each block may include multiple input ports, output ports, and logic gates. For example, referring to FIG. 4A, timing path 401 originates in block 402 and terminates in destination block 408. This timing path is associated with a bucket defined by block 402 and block 408, e.g., bucket_402_408. Timing path 421 of FIG. 4B originates in block 402 and terminates in destination block 428. Timing path 421 includes devices 430 and 432. This timing path is associated with a bucket defined by block 402 and 428, e.g., bucket_402_428. The timing path illustrated in FIG. 4C also originates in block 402 and terminates in destination block 428. Thus, timing path 441 is also associated with bucket_402_428.

Referring back to FIG. 2, the technique for processing timing paths in the integrated circuit design associates similar timing paths within a bucket into a sub-category, e.g., signature (212). Timing paths within a bucket are associated with one or more signatures based on the sequence of devices in the timing path. For example, referring to FIG. 4B and FIG. 4C, although timing paths 421 and 441 both terminate in block 428, contrary to timing path 421, timing path 441 includes devices 450 and 452 of block 428. The device sequence of timing path 421 is associated with a first signature for bucket_402_428, e.g., signature_1, and the device sequence of timing path 441 is associated with a second signature for bucket_402_428, e.g., signature_2.

Paths with similar or identical device sequences are associated with a particular signature. For example, signature 1 of bucket_402_428 includes other timing paths in bucket_402_428 that originate in block 402, terminate in block 428, and include the following sequence of instantiations: a flip-flop substantially similar to flip-flop 424, an inverter substantially similar to inverter 426, a buffer substantially similar to buffer 430, and a flip-flop substantially similar to flip-flop 432. In an exemplary embodiment, a timing path is included in a signature (i.e., categorized with another timing path of a common bucket) if and only if the two paths have an identical device sequential order. An exemplary signature is associated with a bus path, which has identical device order for each bit. This technique may simplify optimization of designs including wide bus paths.

Referring back to FIG. 2, a report including timing information and path statistics for an exemplary design is generated according to the bucket and signature associations for the design (214). An exemplary timing report is included in FIGS. 5A and 5B. Bucket 1_AAA includes at total of 30 paths associated with two signatures, i.e., signature #1 and signature #2, ecram.mux4i.inv.eccgen.fdsql and ecram.mux4i.inv.eccgen, respectively. Note that some pins of eccgen include a flip-flop, those pins of eccgen that do not include a flip-flop terminate at a flip-flop (i.e., fdsql). Signature #1 represents paths of ecram (custom block)→mux4i (4:1 multiplexer with an inverted output)→inv (inverter) →eccgen (custom block)→fdsql (destination flip-flop). The timing paths exhibiting this device sequence are included in signature #1. Signature #1 includes four paths: p1, p2, p6, and p7. The device sequence of signature #2 terminates at a pin of eccgen that includes a flip-flop. Signature #2 represents the complete synchronous timing path of ecram (custom block)→mux4i (4:1 multiplexer with an inverted output)→inv (inverter)→eccgen (custom block). Signature #2 includes 26 paths: p3, p4, p5, p8, p9, p10, p11, p12, p13, p16, p17, p20, p21, p22, p23, p26, p27, p28, p29, p30, p31, p32, p33, p34, p35, and p36. Note that in the above example, the 30 paths of bucket 1_AAA have been grouped as two unique signatures.

FIG. 6 illustrates an exemplary bucket summary. Three hundred and twenty-six timing paths are associated with buckets 1_AAA, 2_BBB, 3_CCC, 4_DDD, 5_EEE, 6_FFF, 7_GGG, including five, one, three, five, seven, two, and 1 signature(s), respectively. In effect, 326 timing paths for optimization are reduced into, at most, 24 signatures for analysis. The number of unique timing improvements sought may be fewer than 24 if some of the 24 signatures have similar characteristics, e.g., signature #1 and signature #2 of discussed above with reference to FIGS. 5A and 5B included common device sub-sequences.

Referring back to FIG. 2, the technique improves a timing path representative of signature (216). Improvements to a signature may include, but are not limited to, changing device sizes, device sequence, quantities of devices, device types, etc. These improvements may be performed by any other suitable technique. Improvements to the timing path may produce a circuit including a circuit element or elements that would not otherwise be included in the circuit. Exemplary improved circuits may include circuit element(s) that are larger in size than typical devices, circuit element(s) that have different device characteristics than typical devices (e.g., replacing devices having a standard threshold voltage with devices have a low threshold voltage), or multiple cascaded instantiations of devices that would otherwise be instantiated only once may be included in improved circuits (e.g., inserting delay elements to increase a common path delay for paths having minimum timing violations). Since each timing path associated with a signature has a substantially similar device sequence, an improvement to a representative timing path of the signature may be applied to the other timing paths included in that signature (218), or even to similar signatures. For example, signature #1 and signature #2 of the timing report of FIGS. 5A and 5B include identical devices subsequences. Consequently, one of ordinary skill in the art might improve both timing paths with a similar or identical solution.

A method consistent with the previous discussion may be embodied in an automated computer software semiconductor design tool for processing design files, which may be executed on a programmable computer. In one exemplary embodiment, software implemented as PERL scripts process design files generated by PEARL Static Timing Analyzer, available from Cadence Design Systems, Inc. Persons of ordinary skill in the art will recognize a variety of design tools and languages appropriate for implementing the teaching described herein. Other variations and modifications of the embodiments disclosed herein, may be made based on the description set forth herein, without departing from the scope and spirit of the invention as set forth in the following claims.

What is claimed is:

1. A method for use in connection with an integrated circuit design, the method comprising:
   identifying distinct timing paths of the integrated circuit design, the distinct timing paths having timing violations;
   identifying a first subset of the distinct timing paths including a plurality of timing paths wherein each of the plurality of timing paths includes at least one first common characteristic;
   within the plurality of timing paths forming the first subset, grouping the timing paths into one or more groups, each timing path within a group having at least one second common characteristic,
   correcting a first timing path violation for one of the timing paths within the group;
   repeating the first timing path violation correction for at least one of the other timing paths within the group; and
   identifying a second subset of the distinct timing paths including a second plurality of timing paths, wherein each of the second plurality of timing paths includes at least one third common characteristic, wherein a particular timing path including the at least one first characteristic and the at least one third characteristic is identified with a subset based on a prioritization of the first subset and the second subset, wherein the prioritization is based at least in part on the number of groups within each subset.

2. The method, as recited in claim 1, wherein the second common characteristic is a sequence of devices.

3. The method, as recited in claim 1, wherein the grouping further includes forming one or more other groups, each timing path within the other groups being a common portion of a timing path of the other groups, and having a common sequence of device elements.

4. The method, as recited in claim 1, wherein the first common characteristic comprises an origin of a timing path.

5. The method, as recited in claim 1, wherein the first common characteristic comprises a destination of a timing path.

6. The method, as recited in claim 1, wherein the first common characteristic comprises inclusion of a first block in a timing path.

7. The method, as recited in claim 1, wherein the first common characteristic comprises inclusion of a first net in a timing path.

8. The method, as recited in claim 1, wherein correcting a first timing path violation includes reducing a maximum timing violation.

9. The method, as recited in claim 1, wherein correcting a first timing path violation includes reducing a minimum timing violation.

10. The method of claim 1, further comprising:
    substituting in the integrated circuit design, a plurality of replacement circuits, each one of the plurality of replacement circuits corresponding to a respective timing path of the group, the plurality of circuits based at least in part on the correction of the first timing path violation.

11. The method of claim 10, further comprising: fabricating an integrated circuit including the plurality of replacement circuits.

12. The method of claim 1, further comprising: preparing the integrated circuit design and thereafter performing the correcting and repeating.

13. A semiconductor integrated circuit manufactured using the method of claim 1.

14. The method of claim 1 further comprising making a computer readable encoding of the semiconductor integrated circuit design, wherein the computer readable encoding is stored on a computer readable medium.

15. The method of claim 1 further comprising:
    preparing one or more design files for the semiconductor integrated circuit design.

16. The method of claim 1 wherein the correcting a first timing path violation comprises inserting at least one circuit element.

17. An article of manufacture comprising:
a computer usable medium having computer readable instructions embodied therein to cause a machine to perform operations including:
identifying distinct timing paths of the integrated circuit design, the distinct timing paths having timing violations;
identifying a first subset of the distinct timing paths including a plurality of timing paths wherein each of the plurality of timing paths includes at least one first common characteristic;
within the plurality of timing paths forming the first subset, grouping the timing paths into one or more groups, each timing path within a group having at least one second common characteristic being a sequence of devices;
correcting a first timing path violation for one of the timing paths within the group;
repeating the first timing path violation correction for at least one of the other timing paths within the group; and
identifying a second subset of the distinct timing paths including a second plurality of timing paths including at least one third common characteristic, wherein a particular timing path including the at least one first characteristic and the at least one third characteristic is identified with a subset based on a prioritization of the first subset and the second subset.

18. An apparatus comprising:
means for identifying distinct timing paths of an integrated circuit design, the distinct timing paths having timing violations;
means for identifying a first subset of the distinct timing paths including a plurality of timing paths wherein each of the plurality of timing paths includes at least one first common characteristic;
within the plurality of timing paths forming the first subset, means for grouping the timing paths into one or more groups, each timing path within a group having at least one second common characteristic;
means for correcting a first timing path violation for one of the timing paths within the group;
means for repeating the first timing path violation correction for at least one of the other timing paths within the group; and
means for identifying a second subset of the distinct timing paths including a second plurality of timing paths, wherein each of the second plurality of timing paths includes at least one third common characteristic, wherein a particular timing path including the at least one first characteristic and the at least one third characteristic is identified with a subset based on a prioritization of the first subset and the second subset, wherein the prioritization is based at least in part on the number of groups within each subset.

19. The apparatus as recited in claim 18, further comprising:
means for substituting in the integrated circuit design, a plurality of replacement circuits, each one of the plurality of replacement circuits corresponding to a respective timing path of the group, the plurality of circuits based at least in part on the means for correcting a first timing path violation.

* * * * *